SERIES TRANSISTOR CIRCUIT WITH SELECTIVELY COUPLED STAGES
Filed Feb. 28, 1964
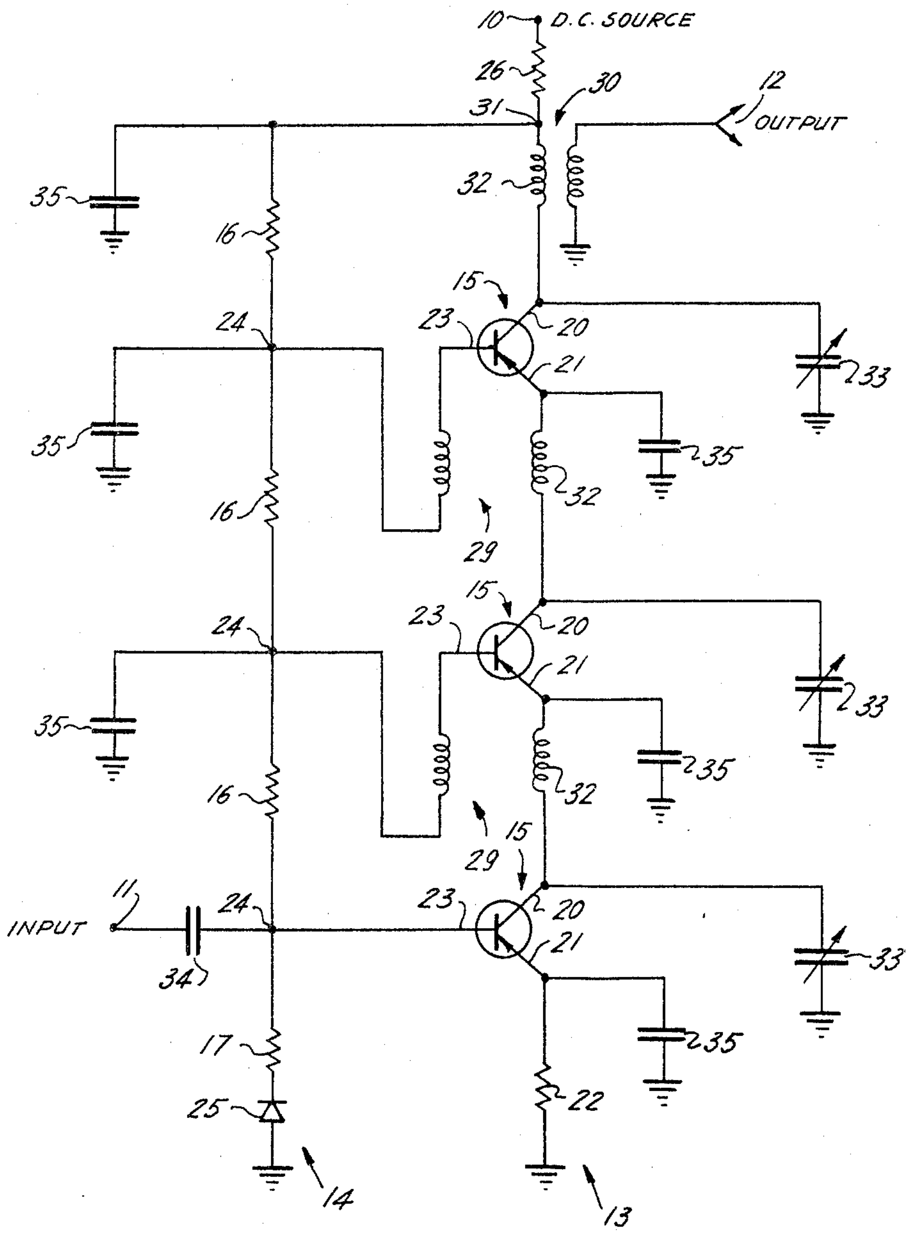
INVENTORS:
ARNOLD FRISCH
LAWRENCE H. WEISS
BY MORRIS ENGELSON
Alan H. Levine
ATTORNEY United States Patent Office 3,274,505
Patented Sept. 20, 1966

3,274,505

SERIES TRANSISTOR CIRCUIT WITH SELECTIVELY COUPLED STAGES

Arnold Frisch, Brooklyn, Lawrence H. Weiss, Forest Hills, and Morris Engelson, Brooklyn, N.Y., assignors, by mesne assignments, to Tektronix, Inc., Beaverton, Oreg., a corporation of Oregon Filed Feb. 28, 1964, Ser. No. 348,121
9 Claims. (Cl. 330—18)

This invention relates to transistors, and more particularly to a circuit arrangement for biasing a plurality of transistors from a single source.

As is known, direct current voltage is required to bias electionic tubes and transistors in order to condition these devices for operation. However, tubes require substantially higher biasing voltages than do transistors. Consequently, electronic tubes in any particular installation cannot simply be replaced by transistors capable of performing the same functions as the tubes, since the relatively high D.C. voltage available for biasing the tubes would break down the transistors thus making them inoperative.

Nevertheless, there are pieces of electronic equipment in which a power supply suitable for use with tubes is present, and yet only a limited space is available to accommodate a particular arrangement of circuits, thereby necessitating the use of transistors instead of tubes due to the smaller space requirements of transistors. A specific example of equipment of the type just mentioned is an oscilloscope, which is an electronic instrument for visually indicating amplitude variations of an electric current with respect to time. There are oscilloscopes presently on the market provided with a chamber, open at the front of the unit, intended to accommodate one of a series of amplifiers adapted to be "plugged into" the chamber. The particular plug-in amplifier chosen depends upon the particular use to which the oscilloscope is to be put. We have designed an adapter equal in dimensions to the plug-in amplifiers mentioned above, so that the adapter can be accommodated by the chamber provided in such oscilloscopes. The adapter as such forms no part of this invention, but is mentioned as an illustrative environment for the present invention. When the adapter is plugged into such an oscilloscope, the instrument is converted to a spectrum analyzer, i.e., an instrument for visually indicating amplitude with respect to frequency rather than with respect to time. The power supply voltage available from the oscilloscope is relatively high, being intended to operate electronic tubes. However, if the spectrum analyzer adapter were constructed with tubes, it could not be made small enough to fit into the plug-in chamber of the oscilloscope. Therefore, transistors must be employed in fabricating the adapter, and the problem of biasing these transistors from a power source more suitable for use with tubes is presented.

It is therefore an object of the present invention to provide a circuit arrangement for biasing transistors from a relatively high voltage source.

It is another object of the invention to provide biasing voltage for the transistors from a relatively high voltage source without drawing excessive current.

It is a further object of the invention to provide such a transistorized circuit arrangement which automatically compensates for voltage variations of the power source as well as variations of the characteristics of circuit components with changes in temperature, in order to maintain the current flowing through the transistors constant.

It is yet another object of the invention to provide a transistorized amplifier arrangement having all of the above advantages.

It is still another object of the invention to provide such a transistorized circuit arrangement in which fewer resistors are required than in conventional transistorized circuits.

To accomplish these objectives, the present invention provides an arrangement including a transistor circuit and a bias-resistor circuit connected in parallel across the relatively high D.C. power source. All the transistors in the transistor circuit are connected in series, and the bias resistors for the transistors are connected in series in the bias-resistor circuit. In this way, the voltage from the source is divided among the bias resistors and their respective transistors. In addition, a resistor is provided between the source and the parallel circuits for limiting the voltage supplied to the total voltage value required to bias the transistors actually employed. Also a resistor is provided in the transistor circuit for establishing the value of the current flowing in that circuit. Furthermore, a diode is provided in the bias-resistor circuit for compensating for voltage drop variations in the transistors as a result of temperature variations of the transistors. Although the transistor and bias circuits provide common D.C. series paths, the various transistor stages are decoupled for alternating currents whereby the different transistor stages may be employed for different purposes. Separate selective A.C. coupling, in an exemplary instance employing transformers, couples selective transistor stages together.

Other objects and advantages of the invention will be apparent from the following description in which reference is made to the accompanying drawing.

The drawing is a schematic circuit diagram of an amplifier arrangement according to the present invention.

Although the embodiment chosen to illustrate the transistor bias arrangement of the invention is a three-stage amplifier, it is to be understood that the invention is not limited to amplifiers, or to amplifiers having any particular number of stages. Furthermore, although three transistors are shown in the drawing, the invention is applicable to arrangements including any number of transistors as long at at least two transistors are involved. In addition, although the circuit as drawn would be used with a negative voltage supply, it is understood that a circuit arrangement according to this invention can be employed with either a positive or negative voltage source.

In the present example, direct current voltage for biasing the transistors is supplied by a source 10. The voltage of the source is relatively high, ordinarily above 75 volts, since it is intended for use with tubes rather than transistors. A signal to be amplified is applied to the arrangement at terminal 11, and the amplified signal is extracted at the terminal 12.

A transistor circuit 13 and a bias-resistor circuit 14 are connected in parallel across the source 10. The transistor circuit 13 includes three transistors 15, and the bias-resistor circuit 13 includes four resistors, three of these resistors bearing the reference numeral 16 and the other resistor bearing the reference numeral 17. The transistors 15 are connected in series, the collector 30 of one being connected to the emitter 21 of the next. Also connected in series with the transistors 15 is a resistor 22, the value of which establishes the amount of current flowing in the transistor circuit. The resistor 22 is shown connected to the emitter 21 of the lowermost transistor 15.

Each of the resistors 16 serves as a bias resistor for one of the transistors 15, and the resistors 16, together with the resistor 17, are connected in series. The bases 23 of the transistors 15 are connected to the successive junctions 24 between the resistors in the circuit 14. Also connected in series with the resistors 16 and 17 is a temperature-compensating diode 25. Between the source 10 and the parallel circuits 13 and 14 is a power-supply-limiting and D.C. feedback resistor 26.

Between each two adjacent transistors 15 is an inter-stage transformer 29 which matches the output resistance of one transistor, say the lowermost transistor 15, to the input resistance of the next succeeding transistor, say the middle transister 15, in the amplifier chain. In other words, the turns ratio between the primary and secondary of each transformer 29 equals the ratio of output resistance of the transistor at one end of the transformer to input resistance of the transistor at the opposite end of the transformer. A transformer 30, located between the collector 20 of the uppermost transistor 15 and the junction 31 between the parallel circuits 13 and 14 and the resistor 26, matches the output impedence of the amplifier to the impedence of the device (not shown) receiving the amplified signal.

The primary winding 32 of each of the transformers 29 and 30 is arranged in series with the transistors 15, each winding being connected to the collector 20 of one of the transistors. Also connected to each collector 20 of each transistor is a variable capacitor 33. The inductor or winding 32 and capacitor 33 connected to each collector 20 comprise a tunable resonant circuit. By adjusting the value of the capacitor 33, the circuit can be caused to resonate at the frequency of the signal applied at the terminal 11, thus producing maximum gain from each amplifier stage.

The capacitor 34 is a D.C. blocking capacitor, i.e., it prevents any direct current component of the input signal from affecting the D.C. conditions within the amplifier. The capacitors 35 are radio-frequency by-pass capacitors, i.e., they prevent radio-frequency signals from being introduced into the circuit arrangement at the points to which the capacitors are connected. The capacitors 35 effectively isolate the transistor stages from one another in the sense that they prevent the alternating current output of one transistor from affecting succeeding transistors in the transistor circuit. Thus the transistors are allowed to operate independently. As a result, each transistor need not necessarily operate as an amplifier. The transistors can individually perform any function that does not require direct current coupling from transistor to transistor. For example, one of the transistors 15 could operate as an amplifier at the same time that another of the transistors operates as an oscillator and a third transistor operates as a mixer.

The operation of the transistor biasing arrangement is as follows:

The voltage available at the source 10, reduced by the amount of voltage drop across the resistor 26, is divided among the resistors 16 and 17 in the bias-resistor circuit 14. The voltage drop across each resistor is, of course, proportional to its ohmic value, and hence the value of the resistor is determined by the biasing potential required by its corresponding transistor. Required biasing potential is a characteristic of any transistor and is established by the transistor manufacturer. Due to the series connection of the transistors and of the bias resistors, the total D.C. biasing voltage utilized by the transistors is much greater than the biasing voltage of an individual transistor. Consequently, such a transistor arrangement is capable of utilizing a much higher power source than usual, even one suitable for use with electronic tubes. Only a single resistor 26 need be employed to limit the power supplied to the circuits 13 and 14 to required levels. Thus, the current drawn by the present arrangement is maintained within acceptable limits.

Furthermore, the present circuit arrangement is extremely stable, i.e., the current through the transistors remains constant regardless of variations in the voltage source 10 or variations in the circuit components caused by their temperature changes. This is true for a number of reasons. In the first place, any variation in the source is divided among the resistors of the circuit 14, thus greatly reducing the effect of such a variation on any one transistor. Secondly, as the temperature of a transistor increases, the voltage drop between its base and emitter decreases, thus tending to increase the current flow through the transistor. However, introduction of the diode 25 compensates for this variation. The resistance of the diode 25 also varies with temperature in such a way that the base voltage of the transistor decreases with increasing temperature. Consequently, any tendency for current flow through the transistor to increase due to increased temperature of the transistor is checked. Thirdly, the present arrangement employs feedback to stabilize the transistor current. Suppose, for example, that the current in the transistor circuit 13 should for some reason increase; the voltage at junction 31 would decrease because the voltage drop across resistor 26 would increase. The voltage available for biasing the transistors is thus reduced, thereby lowering the current flowing through the transistors. Conversely, should the current in circuit 13 decrease, the voltage at junction 31 would increase, thus increasing the biasing voltage of the transistors thereby increasing the current flow through them. It should also be pointed out that since the supply voltage at 10 is relatively large, the resistor 26 may be made large. Consequently, even small current variations in the present arrangement cause relatively large voltage drop variations across resistor 26, thereby enhancing the feedback effect just described and making the present arrangement extremely stable.

The present arrangement requires surprisingly few resistors, as will be apparent from the drawing. Only two resistors are needed in the transistor circuit 13, and the number of resistors in the bias-resistor circuit 14 always equals one more than the number of transistors in the circuit 13. Thus, in the present example, a three transistor-stage amplifier requires only six resistors. If one more stage were added, only a single additional resistor, comparable to the resistors 16, would be required. In conventional transistorized amplifiers, about three resistors per stage must be employed.

A description of the manner in which a specific circuit of the type illustrated is designed may prove helpful toward understanding the invention. The current which will flow in the transistor circuit is determined by the transistors 15, since any transistor requires current flow within definite limits established by the manufacturer. Should one of the transistors require less current than the others, an appropriate resistor can be placed in parallel with it so that the transistor-resistor combination will draw the same current as each of the other transistors. The current to flow in the bias-resistor circuit 14 is chosen by striking a compromise between two contradictory considerations: the current should be as large as possible so that any variations in the current, which cause variations in the biasing voltage of each transistor, will represent small percentage variations; on the other hand, the current should be as small as possible to limit the load represented by the circuit and to limit the heat developed by it.

Next, the value of resistor 22 in the transistor circuit is chosen. It has been found extremely desirable to select a resistor which produces a voltage drop of between one and five volts at the current flowing in the transistor circuit. If the drop across the resistor 22 is less than one volt, the stability of the circuit is adversely affected because the amount of voltage feedback is reruced. If the drop across resistor 22 is greater than five volts, most of the voltage drop in the circuit 14 below the lowermost junction 24 would occur across the resistor 17, thus minimizing the temperature compensating ability of the diode 7. The D.C. voltage drop between the lowermost junction 24 and ground must equal the drop between the base 23 of the lowermost transistor 15 and ground. Since the drop across the emitter-base junction of the transistor is about equal to the drop across the diode 25, the drop across resistor 17 must equal the drop across resistor 22. Thus, once the value of resistor 22 is chosen, the value of resistor 17 is determined inasmuch as its voltage drop is determined, and the current in the circuit 14 has previously been determined.

The values of resistors 16 are chosen so that the voltage drop across each, at the current flowing in the circuit 14, equals the biasing potential required by its respective transitsor. The voltage at junction 31 must be the sum of the voltage drops across the resistors 16 and 17, and the diode 25, and the current at junction 31 must be the sum of the currents in the circuits 13 and 14. Therefore, the value of resistor 26 is determined. It must be such that with the current at junction 31 flowing through it, it produces a voltage drop equal to the difference between the supply voltage at terminal 10 and the voltage at junction 31.

The invention has been shown and described in one form only, and many variations may be made in this embodiment which will still be comprised within the spirit and scope of the invention. It is understood, therefore, that the invention is not limited to any specific form or embodiment except inasfar as such limitations appear in the appended claims.

What we claim is:

1. A transistor arrangement for use with a source of relatively high direct current voltage, comprising a transistor circuit for amplifying alternating current signals at alternating current signal frequencies, and a bias-resistor circuit connected in parallel with said transistor circuit across said source, said transistor circuit including a plurality of transistors connected in series energized relationship for direct currents from said source, said bias-resistor circuit including a bias reisstor for each of said transistors, said bias resistors being connected in series, means for coupling the junctions between said bias resistors to said transistors for the purpose of biasing said transistors, means for decoupling said junctions at said alternating current signal frequencies and for decoupling said transistors in said series energized relationship at said alternating current signal frequencies, and separate means for coupling the output of selected of said transistors to the input of selected other of said transistors at said alternating current signal frequencies.

2. A transistor bias arrangement as defined in claim 1 including a power-supply-limiting resistor in series between said source and said parallel-connected circuits.

3. A transistor bias arrangement as defined in claim 1 including a resistor in said transistor circuit in series with said transistors for determining the value of the current flowing through said transistor circuit.

4. A transistor bias arrangement as defined in claim 3 wherein the value of said current-determining resistor is such that the voltage drop across it is between one and five volts.

5. A transistor bias arrangement as defined in claim 1 including a diode in said bias-resistor circuit in series with said bias resistors for compensating for voltage drop variations in said transistors as a result of temperature variations of said transistors.

6. A transistor arrangement for use with a source of relatively high direct current voltage, comprising a transistor circuit for amplifying alternating current signals at alternating current signal frequencies, and a bias-resistor circuit connected in parallel with said transistor circuit across said source, said transistor circuit including a plurality of transistors each having an emitter electrode, a collector electrode, and a base electrode, said emitter and collector electrodes being connected in series energized relationship for direct currents from said source, said bias-resistor circuit including a plurality of resistors connected in series, said base electrodes being coupled to the successive junctions between said bias resistors, a point of common reference potential, means for coupling said junctions to said point at said alternating current signal frequencies, and means for coupling the emitter electrodes of said transistors to said point at said alternating current signal frequencies, so that said transistors are able to operate substantially independently of one another at said signal frequencies.

7. A transistor amplifier arrangement for use with a source of relatively high direct current voltage, comprising a transistor circuit for amplifying alternating current signals at alternating current signal frequencies, and a bias-resistor circuit connected in parallel with said transistor circuit across said source, said transistor circuit including a plurality of transistors connected in series energized relationship for a direct current from said source, each transistor having a control terminal and an output terminal, said bias-resistor circuit including a bias resistor for each of said transistors, said bias resistors being connected in series, means for coupling the junctions between said bias resistors to control terminals of respective transistors to bias said transistors, means for decoupling said junctions at said alternating current signal frequencies and for decoupling said transistors in said series energized relationship at said alternating current signal frequencies, and transformer means coupling the output terminal of a selected transistor to the control terminal of a selected other transistor to provide a cascaded relationship therebetween.

8. A transistor amplifier arrangement as defined in claim 7 including means resonating a winding of said transformer means, said resonating means being tunable to resonate at the frequency of the signal to be amplified.

9. A transistor amplifier arrangement for use with a source of relatively high direct current voltage, comprising a transistor circuit for amplifying alternating current signals at alternating current signal frequencies, and a bias-resistor circuit connected in parallel with said transistor circuit across said source, said transistor circuit including a plurality of transistors each having an emitter electrode, a collector electrode, and a base electrode, said emitter and collector electrodes being connected in series energized relationship for direct currents from said source, said bias-resistor circuit including a plurality of resistors connected in series, means coupling successive junctions between said bias resistors to the base electrodes of successive transistors, bypass capacitor means for coupling said junctions to ground for alternating current frequencies, bypass capacitor means coupling said emitter electrodes to ground for alternating current frequencies, means for applying a signal to be amplified to the base of the transistor at one end of said transistor circuit, means for extracting the amplified signal from the collector of the transistor at the other end of said transistor circuit, and means coupling the collector electrodes of intervening transistors to the base electrode of the next successive transistor at said alternating current frequencies.

References Cited by the Examiner

UNITED STATES PATENTS

| | | | |
|---|---|---|---|
| 2,926,307 | 2/1960 | Ehret | 330—18 |
| 2,943,267 | 6/1960 | Randise | 330—18 |
| 2,951,208 | 8/1960 | Barton | 330—22 X |
| 3,079,566 | 2/1963 | Ebbinge | 330—22 X |

ROY LAKE, *Primary Examiner.*

F. D. PARIS, *Assistant Examiner.*